Jan. 10, 1956 J. R. SHIELDS 2,730,386
LUBRICATED STUFFING BOX
Filed May 18, 1950 4 Sheets-Sheet 1

Inventor
James Rodger Shields
by Christy, Parmelee & Strickland
Attorneys

Jan. 10, 1956  J. R. SHIELDS  2,730,386
LUBRICATED STUFFING BOX

Filed May 18, 1950 4 Sheets-Sheet 2

Inventor
James Rodger Shields
By
Christy, Parmelee & Strickland
Attorneys

Jan. 10, 1956 J. R. SHIELDS 2,730,386
LUBRICATED STUFFING BOX
Filed May 18, 1950 4 Sheets-Sheet 3

Inventor
*James Rodger Shields*
By Christy, Parmelee & Strickland
Attorneys

2,730,386

LUBRICATED STUFFING BOX

James Rodger Shields, Pittsburgh, Pa., assignor, by mesne assignments, to Blaw-Knox Company, Pittsburgh, Pa., a corporation of Delaware Application May 18, 1950, Serial No. 162,648

3 Claims. (Cl. 286—19)

This invention relates to stuffing boxes and is for a lubricated stuffing box especially designed for use in connection with vessels in which high pressures are encountered, although it is not restricted to such use.

The invention is applicable for use in various places where stuffing boxes are required, but as indicated, is especially useful in connection with equipment where pressures of considerable magnitude are encountered. The invention will hereinafter be described particularly in connection with a high pressure autoclave, but it will be understood that this is by way of illustration and that the invention is applicable to other uses where a motion-transmitting rod or shaft passes from the interior of the chamber where fluids are maintained under pressure other than atmospheric pressure.

Stuffing boxes which are lubricated, have heretofore been employed on autoclaves, and it has been found desirable in practice to employ oil pressure in the stuffing box which is slightly above the pressure of the fluid in the autoclave. With such an arrangement, two seals or stuffing boxes are provided. One of these, the interior one, is between the inside of the autoclave and the outer stuffing box, and the lubricant under pressure is introduced into a space between the two stuffing boxes. Such an arrangement is shown in Patent No. 2,398,944, granted April 23, 1946, to George E. Kopetz. The inner stuffing box therefore needs only to withstand the net differential pressure between the fluid pressure inside the autoclave and the pressure of the lubricant, which differential may be less than 100 pounds per square inch. That is, if the autoclave operates at a pressure of say 3500 pounds per square inch, the oil pressure would be slightly above 3500 pounds per square inch, but the inner stuffing box would only need to withstand the differential pressure. However, the outer stuffing box then seals against the pressure of the lubricant and atmospheric pressure. This varies from relatively low pressure vessels, say up to 1,000 pounds per square inch, to really high pressure applications which may begin at 1,000 pounds and run upward to 5,000 pounds per square inch. As a matter of fact, autoclaves have been built to withstand operating pressures of 9,000 pounds.

It has been found that when packings used under such conditions of pressure fail, the lowermost portion of packing body, as for example the lowermost or innermost chevron rings, give way or crush, resulting in the scoring of the drive shaft for the agitator at this point, and failure of the packing then results. The scoring of the shaft which indicates failure, always occurs at the first few chevron rings adjacent the high pressure oil, and the remainder of the shaft is always in good condition.

In a copending application, Serial No. 162,650, filed May 18, 1950, of Arthur F. Saxon, now Patent No. 2,684,274, there is disclosed a multiple-stage packing designed to relieve this situation, arranged so that the end thrust of oil applied under pressure on one stage is not transmitted to the other stages.

The present invention makes use of a multi-stage packing as disclosed in the said Saxon application, but it provides a controlled drop in pressure between successive stages of the packing so that there is a controlled differential in pressure across each stage. The total pressure to be confined is therefore distributed among the several stages making it possible to avoid overloading of the packing and avoid failure, even with extremely high pressures.

My invention has, therefore, as its object to provide in a multi-stage packing a lubricating system having a controlled pressure drop in the lubricant across each stage.

The invention has for its further object to provide a system of this kind wherein all of the oil flows in series through all of the stages so that only one pump and pressure-regulating system is required, hydraulic resistance elements being provided externally of the gland itself.

A further object of the invention is to provide a lubricated stuffing box of the class described which is made as a compact assembly, and which is flexible to meet the various operating conditions and requirements of the unit on which it is installed.

My invention may be more fully understood by reference to the accompanying drawings, in which.

Figure 1:
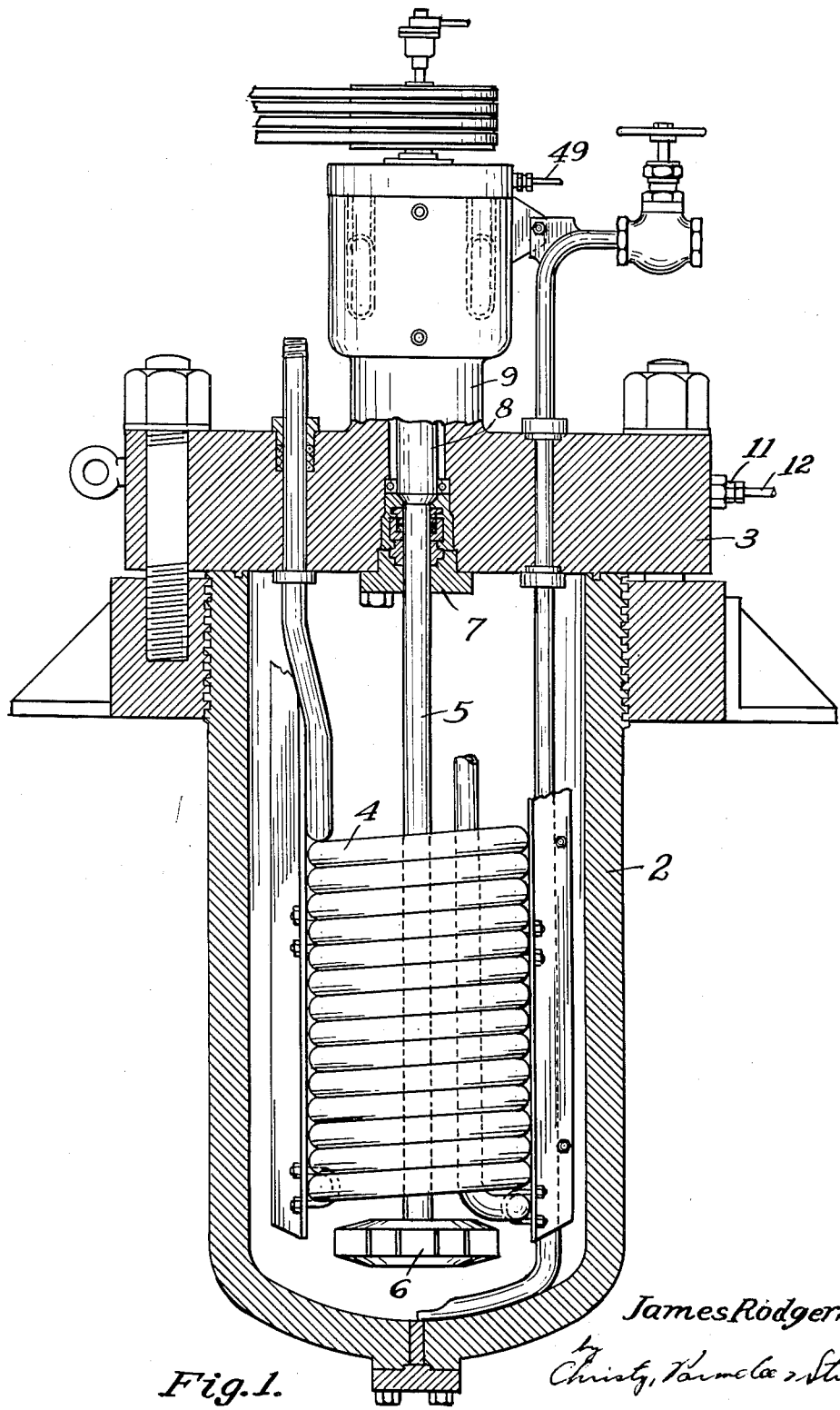
Fig. 1 is a section through an autoclave constructed in accordance with my invention, and showing only the lower packing, the upper packing assembly being shown in elevation.

In the drawings, 2 designates any vessel or structure in which there is fluid under pressure. It is illustrated as comprising an autoclave having a separate head 3 secured thereto. It is provided with an internal heating coil 4, and an agitator shaft 5 on the lower end of which is the agitator 6. The agitator shaft 5 passes through an inner gland or stuffing box 7 which may be of any known or preferred type, and at the upper end of the shaft 5 there is a coupling 8 which is above the stuffing box 7 and which projects upwardly into the lower part of a stuffing box receptacle or nozzle 9 that projects integrally from the top 3 of the autoclave, and which contains the outer stuffing box.

Provision is made for supplying the lubricant under pressure to the inner stuffing box 7, and to the shaft bearings immediately above it through a passage 10 (see Fig. 3) which terminates in a nipple 11 (see Fig. 1), and to which a lubricant supply pipe 12 connects.

There is a multiple stage cartridge type stuffing box in the nozzle or receptacle 9 which is of the general construction disclosed in the aforementioned Saxon application, and which comprises a sleeve 13 having a flange 14 at the top thereof, the sleeve being adapted to fit the interior of the receptacle or nozzle 9 while the flange 14 abuts against the end of the nozzle and is bolted thereto. The top of the nozzle is recessed around the upper end of the sleeve to receive a body of packing 15, such as a chevron packing. This packing establishes a seal between the sleeve and the nozzle, both of which are stationary, and therefore it is capable of resisting the total pressure to which it may be subjected. The interior of the sleeve is provided with a bore of outwardly-decreasing diameter, the bore being stepped or shouldered.

The smallest portion of the bore near the outer end is of a diameter such as to accommodate the drive shaft 16 which extends through the stuffing box and the lower end 16a of which is splined to engage the socket 8 at the top of the agitator shaft. The outer face of the sleeve around the shaft is countersunk to accommodate an anti-friction bearing 17, and the inner end of the sleeve is also counterbored to accommodate an anti-friction bearing 18. There is a packing element or body 19 such as a chevron packing in the sleeve supported on the first shoulder downwardly from the top. A thrust ring or collar 20 is supported on the next shoulder. It will be noted that the thrust ring 20 actually bears against the shoulder so that it cannot move outwardly or upwardly past the shoulder. The ring 20 is of generally I-shaped section, and the web of the I has holes therethrough so as to provide channels for lubricant. The upper end of the spacing ring 20 bears against the packing 19. Supported on the thrust ring 20 is a second packing element 21 similar to 19, but of increased diameter, and on the next shoulder there is a thrust ring or separator 22 similar to 20, but also of larger diameter, and against this thrust ring there is another packing 23 similar to 19 and 21, but of still larger diameter. The packing 23 terminates above the anti-friction bearing 18, and there is a keeper ring 24 inside the sleeve to hold the packing 23 in place.

Figure 2:
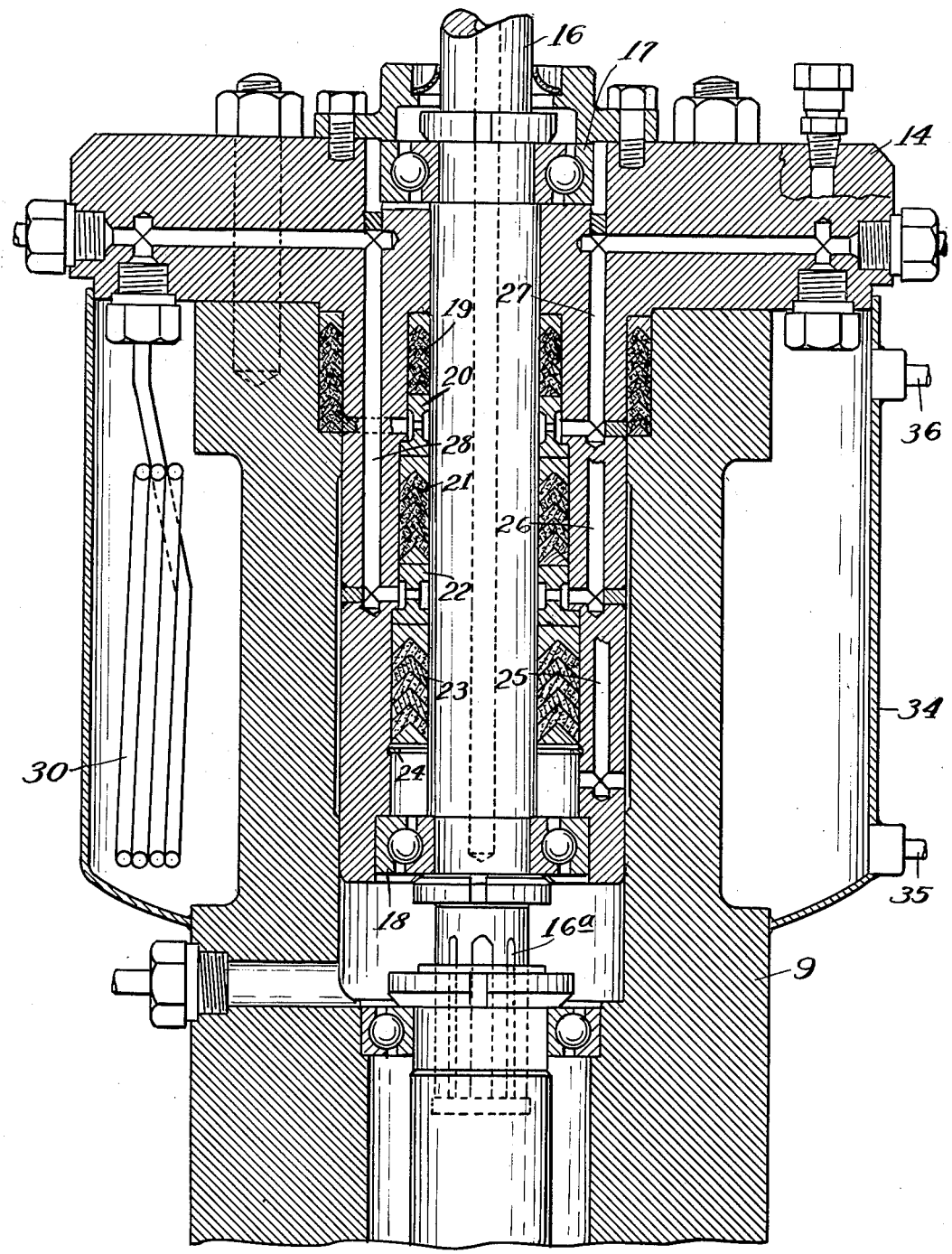
Fig. 2 is a vertical section through the upper or outer packing.
Figures 3, 4:
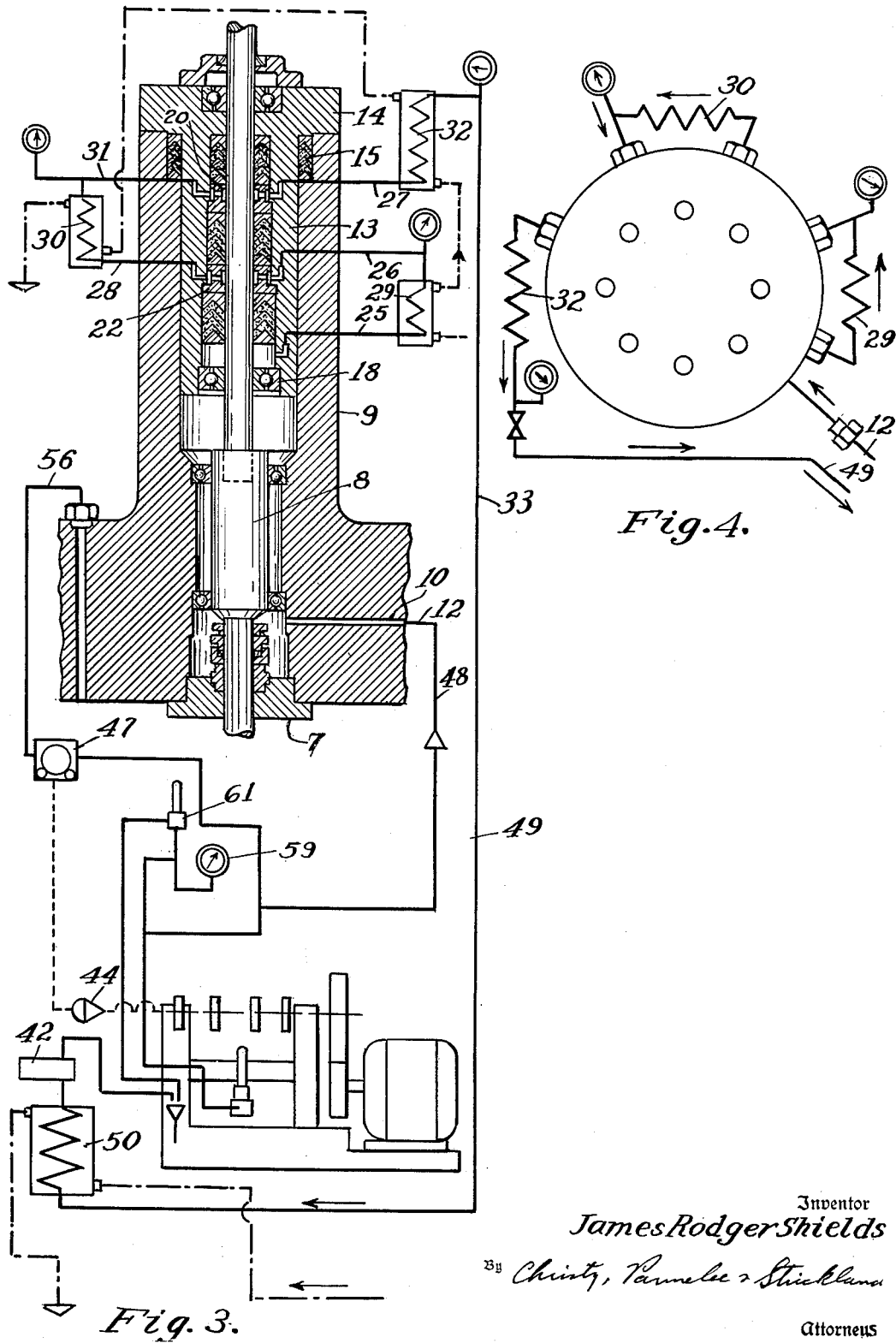
Fig. 3 is a schematic view of the packing and lubricant supply system.
Fig. 4 is a top plan view of the packing, showing diagrammatically the arrangement of the hydraulic resistance elements, and showing actually the point where the connections are provided for the various pipe connections.

There are provided within the sleeve at different points around its periphery, vertically-extending passageways. Some of these passageways, for purposes of illustration, are incorrectly shown in Fig. 2 as being in the same plane, whereas actually they are disposed at different places around the sleeve. The first passage, designated 25, opens into the space below the packing 23. The next one, 26, opens into the oil space provided by the separator 22, while still another passage, 27, opens into the space provided by the separator 20. Another vertical passage 28 also opens into the oil space provided in the separator or thrust ring 22. The arrangement of these passages is best shown in diagram Fig. 3. Oil under pressure flowing into the lower packing 7 flows up through the anti-friction bearings around the coupling member 8. It then flows upwardly around the bearings 18. It then flows up the passage 25 to the end of the sleeve through a hydraulic resistor 29, which is in the form of a coil, and back through passage 26 to the oil space in the separator 22. Then it flows from the space 22 through passage 28 to a hydraulic resistor 30, also in the form of a coil, then it flows through passage 31 to the oil space of the separator 20, and from the oil space of the separator 20 it flows through a passage 27 through hydraulic resistor 32, and from 32 it flows into an oil return line 33. As a matter of practical construction, the coils 29, 30 and 32 are connected to nipples on the underside of the flange 14, and are arranged as shown in Fig. 2, where one coil 30 appears in section. In Fig. 4 the location of these coils around the periphery is also diagrammatically shown, but actually the coils are under the flange 14 instead of around the outside of it as schematically indicated in this figure. The disposition of two of these coils is shown in dotted lines in Fig. 1.

Secured to the nozzle 9 is a sheet metal jacket 34 which provides a water chamber in which the several coils on the underside of the flange 14 are hung, and pipes 35 and 36 provide for the circulation of water through this chamber. In the diagram shown in Fig. 3, each coil is indicated as being immersed in a separate cooling chamber, and the dot-and-dash flow lines are intended to diagram the flow of cooling water. Actually, however, all of the coils may be immersed in a single container or chamber as indicated in Fig. 2.

Moreover the arrangement is such that the whole stuffing box with its lubricating system and coils is assembled as a shop assembly, even including the drive shaft, and if repairs or replacements have to be made, the whole structure can be removed from the nozzle or receptacle for the stuffing box by removing the bolts which hold the stuffing box in place and the shaft, bearings, packings, and hydraulic resistances can all be removed from the nozzle as a unit.

Each hydraulic resistance simply impedes the free flow of the oil from the oil space at one stage of the multiple stage packing to the oil space at the next stage, thereby producing a drop in pressure. Thus there is a proportion differential of pressure across each stage of the packing, and no single stage is subjected to the full differential between the input oil pressure and the atmopshere. For example, assuming that there might be an oil input pressure of 3,000 pounds, the pressure drop through the hydraulic resistance 29 might reduce the pressure 1,000 pounds, so that the differential in pressure on opposite ends of the packing 23 would be only 1,000 pounds. If resistance 32 also reduced the pressure 1,000 pounds, then the pressure difference between the second and third stages, i. e., across the packing 21, would also be only 1,000 pounds. A third resistor 32 would further diminish the pressure of the oil so that their would be atmospheric pressure at the discharge end of the resistor 32 and hence the differential across the final packing would also be approximately 1,000 pounds. Because there is an apportioned pressure drop across each stage of the packing, overloading the packing in any stage can be avoided. When necessary, there may be more than three stages in the packing, either for use with higher pressures, or for use where it is not desired to put more than a predetermined load on any packing.

Figure 5:
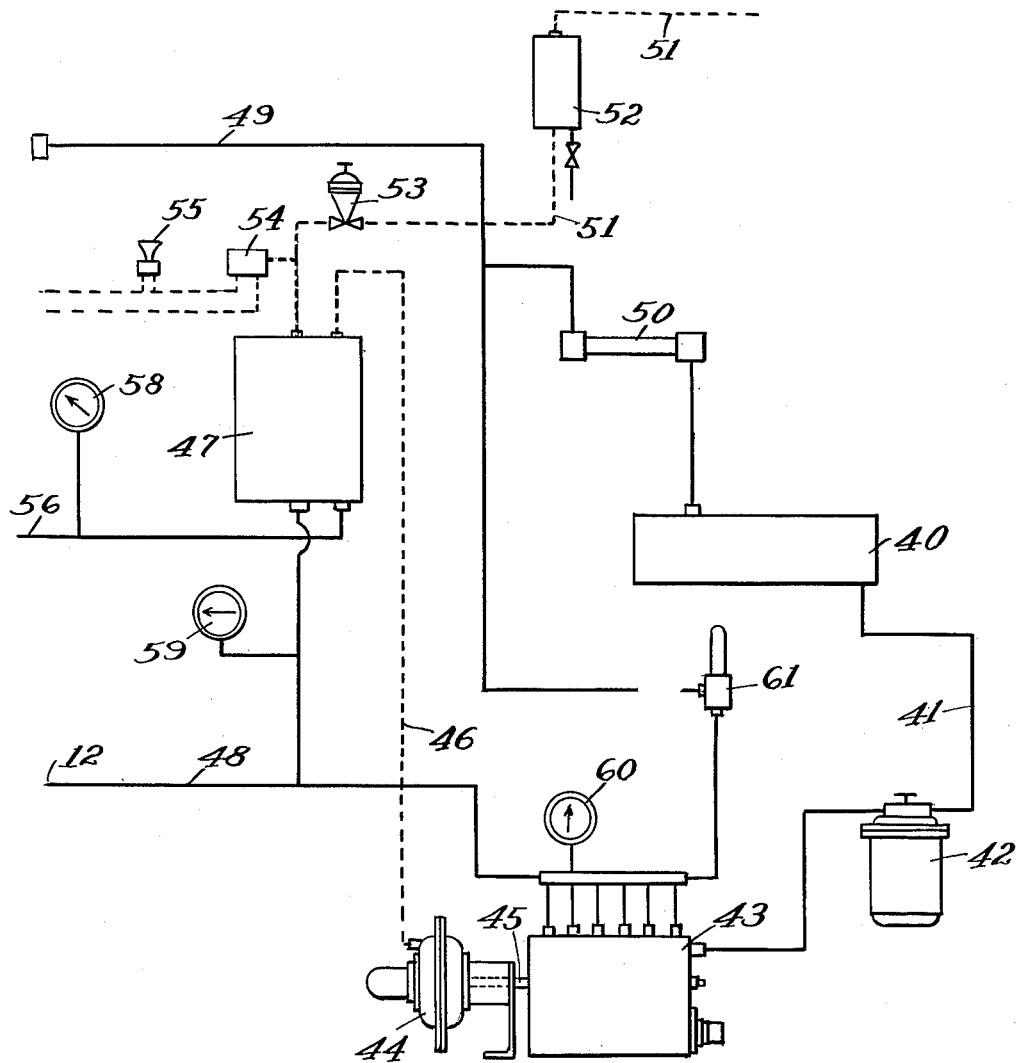
Fig. 5 is a schematic view of the automatic circulating system, the stuffing box, however, not being shown.

For supplying the oil under pressure, the system shown in Figs. 3 and 5 has beed developed. Starting with an oil reservoir 40, the oil may flow through pipe 41 and a filter 42 to a pump 43 which is any suitable high pressure pump. I may use a diesel fuel injection pump of well-known type capable of discharging a variable amount of liquid at quite high pressure. Diesel injection fuel pumps of this character are normally provided with a control rod which may be shifted to change the effective piston displacement of the pump and thereby vary the output or the pressure developed by the pump. With the present system, an air motor of the diaphragm type 44 is coupled to the rod 45 which so controls the pump. An air control line 46 connects the diaphragm motor 44 with a pneumatic differential control type of instrument 47 of a well-known construction, which may also be an indicating or recording mechanism, which instrument responds to the pressure in the autoclave, the arrangement being such that as the pressure in the autoclave increases, the displacement of the pump is increased, resulting in an increase in the output pressure.

When there is no pressure in the autoclave, the pump 43 runs at its lowest delivery rate. A small stream of oil flows through the stuffing box, including the coils 29, 30 and 32 in series, just sufficient to build up a pressure of say 100 pounds gauge at the discharge side of the pump. As the pressure in the autoclave increases (due for instance to heating the charge or chemical reaction which takes place in the autoclave) the control 47 increases the air pressure on the diaphragm motor 44, thus operating the pump control rod 45 to cause the pump to deliver oil at a greater rate, and the apparatus is so adjusted that the output pressure of the pump 43 will always be a predetermined amount, say somewhere around 100 pounds higher than the pressure in the autoclave.

The stuffing box lubricating system is preferably designed to accommodate a flow of oil sufficient to keep the stuffing box at a temperature which is not too high, the oil or lubricant acting as a cooling fluid. At the same time as the rate of flow increases, the resistance increases, the resistance being a function of the rate of flow so that one may provide a system where oil is supplied to the inner end of the stuffing box at a pressure higher than the pressure in the autoclave, and the pressure so applied can be apportioned automatically and in predetermined ratios to the several stages of the packing in the stuffing box.

Returning to the diagram Fig. 5, the oil is discharged from the pump 43 through pipe 48, which connects to the oil pipe 12 leading into the stuffing box 7. Oil returning from the stuffing box at substantially atmospheric pressure flows through the pipe 49 through a heat exchanger or cooler 50 back to the reservoir 40. Dotted line 51 indicates the air pressure supply line for operating the diaphragm motor 44, 52 being an air filter in advance of the recording differential control pressure 47. 53 indicates a regulator valve in the line 51, and 55 is an audible alarm operated by a pressure reservoir medium 54. Pipe 56 leads to a nipple in the top of the autoclave through which the pressure in the autoclave is transmitted to the differential controller 47, and 58 is a gauge that shows the autoclave pressure. 59 is another gauge which shows the oil pressure, and 60 is a gauge on the pump itself. A pressure relief valve or safety valve is provided at 61, which will bypass high pressure fluid from the pump to the low pressure side of the system in the event predetermined pressures are exceeded.

The oil on being forced through the resistance coils of course is heated, and it is also heated by reason of absorption of heat from the stuffing box. The hotter it becomes, the lower is its viscosity. The most viscous oil is that which flows through the first coil 29, while the most fluid oil is that which is leaving the stuffing box and flows through the coil 32. For this reason, it may be feasible to make the coil 29 of less resistance and the coil 32 of more resistance than the intermediate coil 30, in order to get a more even apportionment of the pressure drops in each stage. This is indicated in the diagrams, Figs. 3 and 4. The system herein disclosed is the subject of a copending application Serial No. 162,668, filed May 18, 1950, by Paul Skillman, now Patent 2,649,318.

My invention thus provides a lubricated stuffing box having a multi-stage packing with means for apportioning the pressure drop of the lubricant across the several stages of the packing, and thus distribute the total differential pressure between the workng pressure inside the system and atmosphere among the several stages. My invention further provides a very simple system by which this result is accomplished.

While I have shown and described a preferred embodiment of my invention, it will be understood that various changes and modifications may be made in the construction and the arrangement of parts within the contemplation of my invention and under the scope of the following claims.

I claim:

1. In a lubricated stuffing box positioned within a wall through which a rotary shaft enters a chamber containing a fluid being treated at high pressure and preventing the high pressure fluid from being forced past the stuffing box, the combination of a plurality of sets of packing disposed within the stuffing box and enclosing the shaft, a spacing member disposed between adjacent sets of packing and enclosing the shaft, each spacing member having an annular apertured cavity for reception of lubricant for the shaft, apertures in the stuffing box communicating respectively with the shaft below the lowermost set of packing and with each spacing member cavity for passage of lubricant through the stuffing box and to the shaft, a pressurized closed circuit conduit connecting said stuffing box apertures in series to successively pass lubricant from beneath the lowermost set of packing and around the sets of packing to the spacing members, the lubricant being initially introduced into the stuffing box at a pressure greater than that within the chamber, and means for reducing the pressure of the lubricant after each successive passage through the stuffing box.

2. The lubricated stuffing box as in claim 1 wherein the closed circuit conduit includes hydraulic resistance coils disposed externally of the stuffing box and through which the lubricating oil flows during each successive passage through the stuffing box.

3. The lubricated stuffing box as in claim 2 in which each said resistance coil is mounted in a liquid-cooled compartment to cool the lubricant passing through the coil.

References Cited in the file of this patent

UNITED STATES PATENTS

| 641,825 | Boulet | Jan. 23, 1900 |
| 774,270 | Palmer | Nov. 8, 1904 |
| 1,943,578 | Bigelow et al. | Jan. 16, 1934 |
| 1,994,169 | Comins | Mar. 12, 1935 |
| 1,996,779 | Wheeler | Apr. 9, 1935 |
| 2,017,290 | Parker | Oct. 15, 1935 |
| 2,175,868 | Bentley | Oct. 10, 1939 |
| 2,320,589 | Gruetjen | June 1, 1943 |
| 2,332,150 | Huff | Oct. 19, 1943 |
| 2,649,318 | Skillman | Aug. 18, 1953 |

FOREIGN PATENTS

| 591,361 | Germany | Jan. 20, 1934 |